(12) United States Patent
Barton et al.

(10) Patent No.: US 8,682,867 B2
(45) Date of Patent: Mar. 25, 2014

(54) DELETED DATA RECOVERY IN DATA STORAGE SYSTEMS

(75) Inventors: Leslie A. Barton, San Jose, CA (US);
Gavin S. Johnson, San Jose, CA (US);
Michael J. Koester, Hollister, CA (US);
Carrie J. Van Noorden, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 13/184,432

(22) Filed: Jul. 15, 2011

(65) Prior Publication Data

US 2013/0018852 A1 Jan. 17, 2013

(51) Int. Cl.
*G06F 7/00* (2006.01)
*G06F 17/00* (2006.01)

(52) U.S. Cl.
USPC .................. 707/692; 707/687; 707/662

(58) Field of Classification Search
None
See application file for complete search history.

(56) References Cited

U.S. PATENT DOCUMENTS

| 5,175,837 | A  | * | 12/1992 | Arnold et al. | 711/152 |
| 5,193,184 | A  |   | 3/1993  | Belsan et al. | |
| 7,243,136 | B2 | * | 7/2007  | Huston et al. | 709/217 |
| 2006/0106880 | A1 | * | 5/2006  | Wang et al. | 707/200 |
| 2010/0094811 | A1 |   | 4/2010  | Lehr et al. | |
| 2012/0260022 | A1 | * | 10/2012 | Ittah et al. | 711/103 |

* cited by examiner

*Primary Examiner* — Jau-Shya Meng
(74) *Attorney, Agent, or Firm* — Zilka-Kotab, PC

(57) ABSTRACT

A system includes a data storage device for storing storage volumes, logic adapted for associating an indicator with a data set on the storage volumes, the indicator being in a first state indicating that the data set is accessible, logic adapted for storing the indicator in a data set descriptor record that is stored in at least one mapping of the storage volumes, logic adapted for receiving a request to delete the data set, logic adapted for changing the indicator to a second state indicating that the data set is inaccessible in response to the request to delete the data set, with the proviso that the data set is unchanged, logic adapted for receiving a request to restore the deleted data set, and logic adapted for restoring the indicator from the second state to the first state in response to the request to restore the deleted data set.

19 Claims, 5 Drawing Sheets

DELETED DATA RECOVERY IN DATA STORAGE SYSTEMS

BACKGROUND

The present invention relates to data storage, and more particularly, this invention relates to preserving and recovering data after deletion by a user in data storage systems and networks.

In conventional system architectures, data is often stored in logical structures on one or more logical volumes and are accessed with the assistance of logical addresses, or "pointers," associated with the logical structures. For example, in the IBM® z/OS operating system, user data on a storage volume is kept in logical structures called "data sets," and pointers to these data sets are maintained within Data Set Control Block (DSCB) records in a Volume Table of Contents (VTOC). When a data set is deleted, the pointers to the data set within the DSCB are destroyed and access to the user data is lost. However, the data itself is still stored to the storage volume. Unless the data set is erased from the volume when the pointer is deleted, or new data is written over the data sets, the original data is preserved even though the system now lacks pointers to the data.

Often as a result of human error, data may be accidentally deleted, or the wrong data may be deleted by mistake, resulting in the loss of valuable information and deleterious effects on production efficiency. These deletion events may be infrequent occurrences but, when they do occur, the results can be catastrophic depending on the contents of the data set and/or the system processes relying upon it.

In order to address this problem of accidental data loss, some developers have relied upon duplicating data onto backup volumes so that they may be manually restored upon accidental loss. These backup solutions are undesirable because they are time-consuming and require the temporary use of additional storage media that may not be available at the instant of data loss. Under conventional backup regimes, data duplication occurs at regularly scheduled intervals, typically during overnight periods. Therefore, if data is lost in the interim between backup events, any corresponding changes to the data since the last backup event are also lost. The ultimate result is frequent and undesirable loss of data, because losses almost invariably occur between backup events.

In some approaches, such as IBM® virtual storage access method (VSAM) volume data set recovery, as disclosed in U.S. Patent Publication No. 2010-0094811, a system where a separate volume data set recovery tool is provided with several modules may aid in recovery of deleted data sets. In particular, a store module maintains data characteristics, including the associated logical address, in an indexed table. Upon accidental deletion of data and/or the associated logical address pointer, a retrieve module may retrieve characteristics including the pointer from the table and restore them as needed using an index key.

However, there are still issues with this and other data recovery tools. Data that was deleted may still be overwritten by subsequent data being written to the storage volume. Additionally, the data may simply be removed from the storage volume, since there is no way of determining that the data exists since the pointers to the data no longer exist. Therefore, these tools do not protect the data set from being deleted constructively by overwriting the data set.

BRIEF SUMMARY

In one embodiment, a system includes a data storage device for storing one or more storage volumes, logic adapted for associating an indicator with a data set on the one or more storage volumes, wherein the indicator is in a first state indicating that the data set is accessible, logic adapted for storing the indicator associated with the data set in a data set descriptor record, wherein the record is stored in at least one mapping of the one or more storage volumes, logic adapted for receiving a request to delete the data set, logic adapted for changing the indicator to a second state indicating that the data set is inaccessible in response to the request to delete the data set, with the proviso that the data set is unchanged, logic adapted for receiving a request to restore the deleted data set, and logic adapted for restoring the indicator from the second state to the first state in response to the request to restore the deleted data set.

In another embodiment, a computer program product for restoring deleted data includes a computer readable storage medium having computer readable program code embodied therewith, the computer readable program code including computer readable program code configured to associate an indicator with a data set on one or more storage volumes, wherein the indicator is in a first state indicating that the data set is accessible, computer readable program code configured to store the indicator associated with the data set in a data set descriptor record, wherein the record is stored in at least one mapping of the one or more storage volumes, computer readable program code configured to receive a request to delete the data set, computer readable program code configured to change the indicator to a second state indicating that the data set is inaccessible in response to the request to delete the data set, with the proviso that the data set is unchanged, computer readable program code configured to receive a request to restore the deleted data set, and computer readable program code configured to restore the indicator from the second state to the first state in response to the request to restore the deleted data set.

In yet another embodiment, a method for recovering deleted data includes associating an indicator with a data set on one or more storage volumes, wherein the indicator is in a first state indicating that the data set is accessible, storing the indicator associated with the data set in a data set descriptor record, wherein the record is stored in at least one mapping of the one or more storage volumes, receiving a request to delete the data set, changing the indicator to a second state indicating that the data set is inaccessible in response to the request to delete the data set, with the proviso that the data set is unchanged, receiving a request to restore the deleted data set, and restoring the indicator from the second state to the first state in response to the request to restore the deleted data set.

Other aspects and embodiments of the present invention will become apparent from the following detailed description, which, when taken in conjunction with the drawings, illustrate by way of example the principles of the invention.

DETAILED DESCRIPTION

Figure 1:
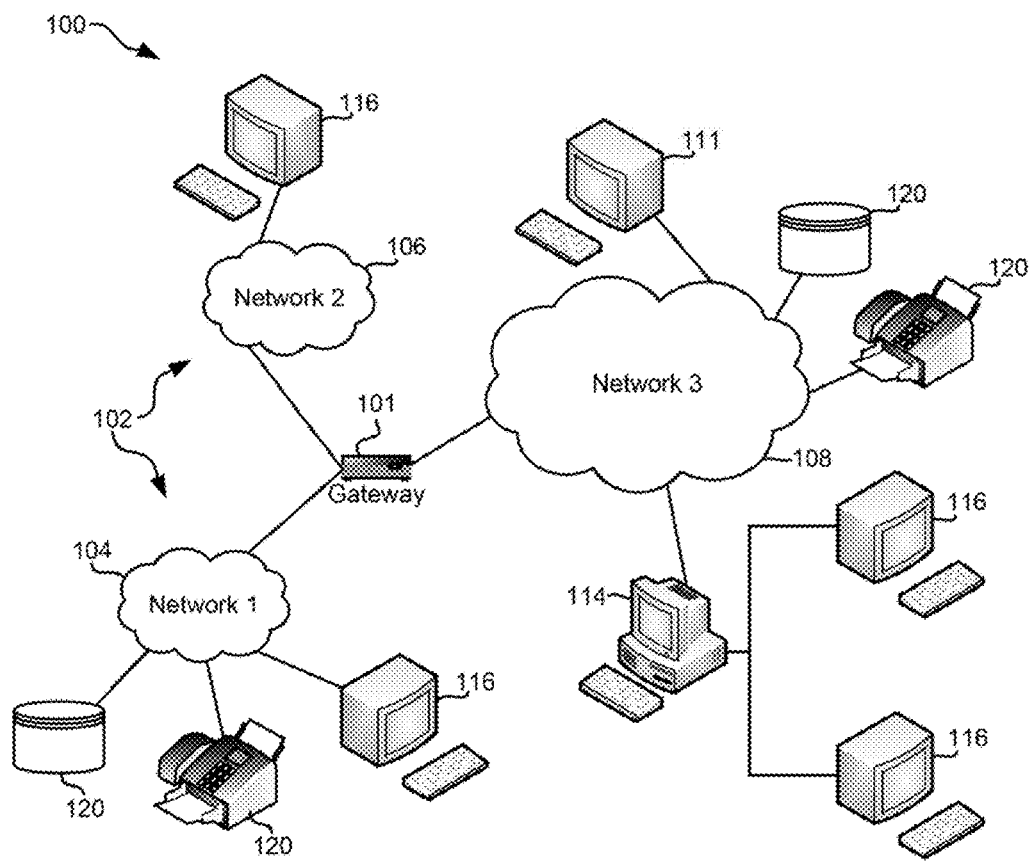
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for recovering deleted data.

Conventional methods for data recovery do not include a feature making data inaccessible on a storage volume without concurrently erasing the data. Furthermore, conventional methods utilize additional tools apart from the operating system in order to accomplish data recovery, which adds additionally complexity and opportunity for failure when data recovery is attempted.

Therefore, it would be of great utility to preserve and recover data after deletion from storage systems and networks, particularly when the preservation of deleted data against overwrite is maximized for subsequent recovery after deletion.

In one general embodiment, a system includes a data storage device for storing one or more storage volumes, logic adapted for associating an indicator with a data set on the one or more storage volumes, wherein the indicator is in a first state indicating that the data set is accessible, logic adapted for storing the indicator associated with the data set in a data set descriptor record, wherein the record is stored in at least one mapping of the one or more storage volumes, logic adapted for receiving a request to delete the data set, logic adapted for changing the indicator to a second state indicating that the data set is inaccessible in response to the request to delete the data set, with the proviso that the data set is unchanged, logic adapted for receiving a request to restore the deleted data set, and logic adapted for restoring the indicator from the second state to the first state in response to the request to restore the deleted data set.

In another general embodiment, a computer program product for restoring deleted data includes a computer readable storage medium having computer readable program code embodied therewith, the computer readable program code including computer readable program code configured to associate an indicator with a data set on one or more storage volumes, wherein the indicator is in a first state indicating that the data set is accessible, computer readable program code configured to store the indicator associated with the data set in a data set descriptor record, wherein the record is stored in at least one mapping of the one or more storage volumes, computer readable program code configured to receive a request to delete the data set, computer readable program code configured to change the indicator to a second state indicating that the data set is inaccessible in response to the request to delete the data set, with the proviso that the data set is unchanged, computer readable program code configured to receive a request to restore the deleted data set, and computer readable program code configured to restore the indicator from the second state to the first state in response to the request to restore the deleted data set.

In yet another general embodiment, a method for recovering deleted data includes associating an indicator with a data set on one or more storage volumes, wherein the indicator is in a first state indicating that the data set is accessible, storing the indicator associated with the data set in a data set descriptor record, wherein the record is stored in at least one mapping of the one or more storage volumes, receiving a request to delete the data set, changing the indicator to a second state indicating that the data set is inaccessible in response to the request to delete the data set, with the proviso that the data set is unchanged, receiving a request to restore the deleted data set, and restoring the indicator from the second state to the first state in response to the request to restore the deleted data set.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic", a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
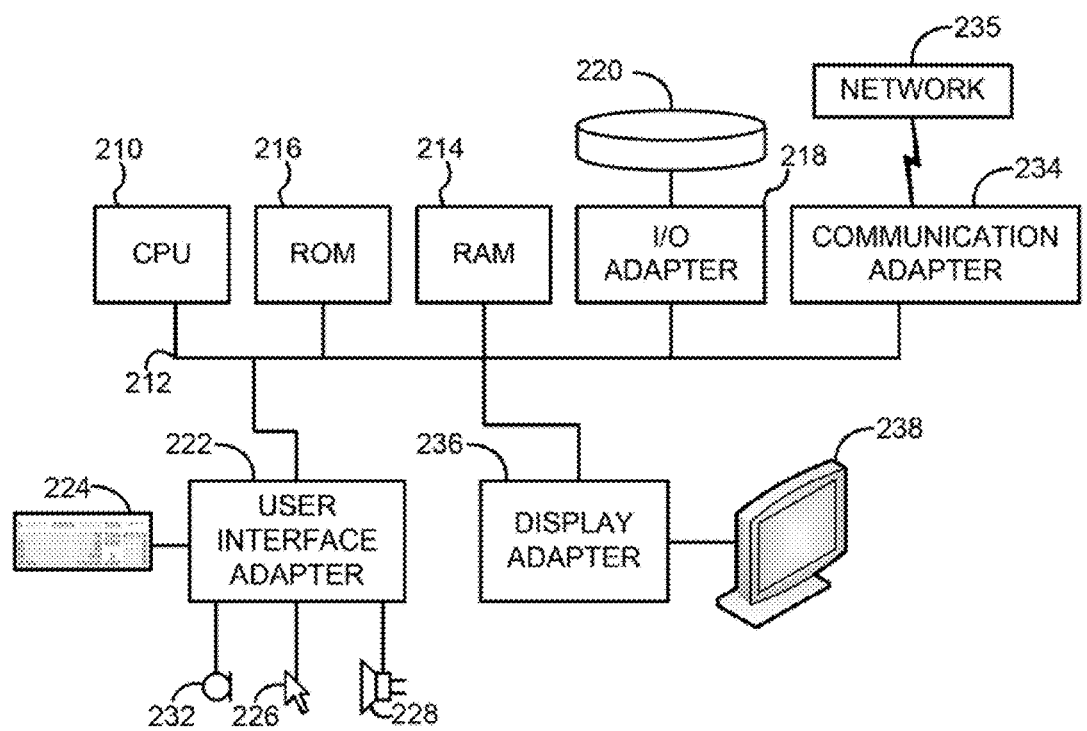
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology.

Object oriented programming (OOP), which has become increasingly used to develop complex applications, may be used.

Figure 3:
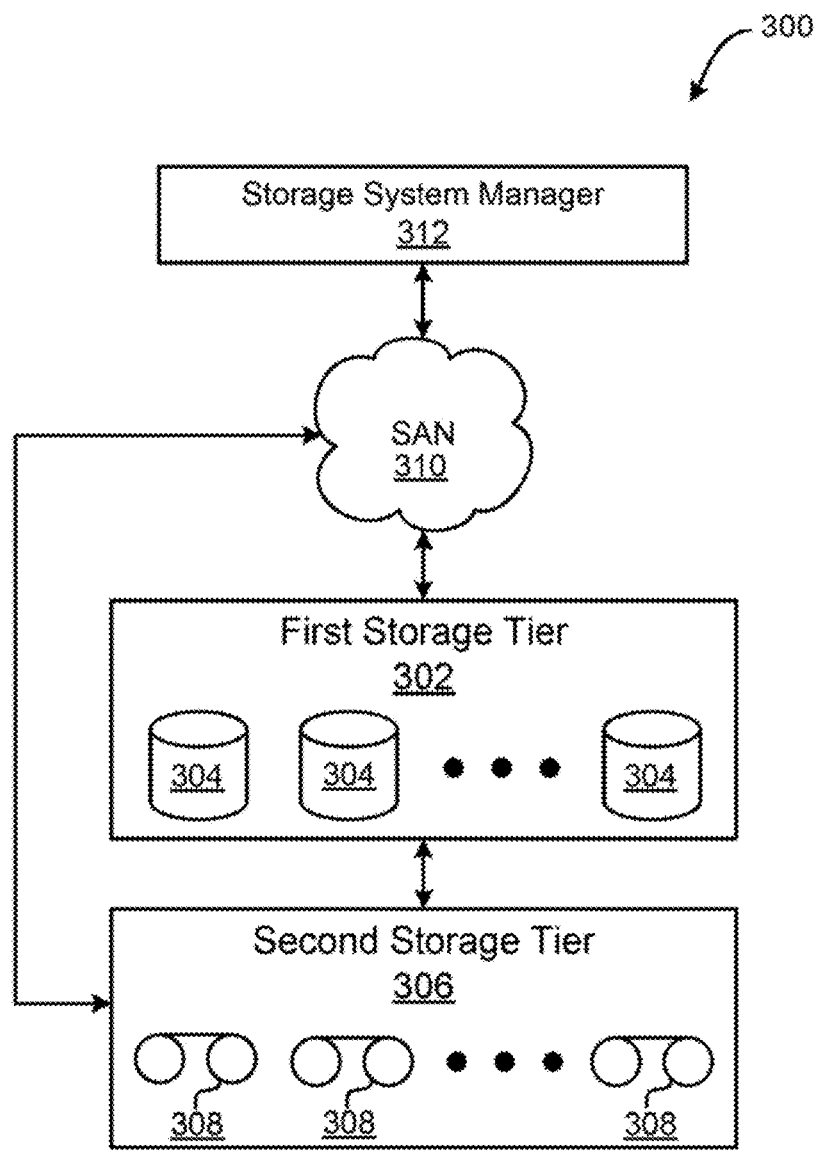
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on a higher storage tier 302 and a lower storage tier 306. The higher storage tier 302 preferably may include one or more random access and/or direct access media 304, such as hard disks in hard disk drives (HDDs), nonvolatile memory (NVM), solid state memory in solid state drives (SSDs), etc., and/or others noted herein. The lower storage tier 306 may preferably include one or more sequential access media 308, such as magnetic tape in tape drives, optical media, etc., and/or others noted herein. Additional storage tiers 316 may include any combination of storage memory media. The storage system manager 312 may communicate with the storage media 304, 308 on the higher and lower storage tiers 302, 306 through a network 310, such as a storage area network (SAN), as shown in FIG. 3. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic adapted to receive a request to open a data set, logic adapted to determine if the requested data set is stored to a lower storage tier 306 of a tiered data storage system 300 in multiple associated portions, logic adapted to move each associated portion of the requested data set to a higher storage tier 302 of the tiered data storage system 300, and logic adapted to assemble the requested data set on the higher storage tier 302 of the tiered data storage system 300 from the associated portions.

Of course, this logic may be implemented as a method on any device and/or system or as a computer program product, according to various embodiments.

In many conventional approaches, when data is initially deleted, for example by a user, the data is only issued a provisional deletion status, or "soft deleted." In other words, the data is neither permanently deleted, nor are any references to the data removed or invalidated. Once data in such a provisional status is scheduled for permanent deletion, or "hard deleted," pointers to the data are removed or otherwise invalidated, making the data inaccessible to the system and releasing the corresponding physical locations for overwrite and storage of other data. However, the data in that corresponding physical location is not physically removed from the storage medium until being overwritten or until the physical medium is reformatted, corrupted, or otherwise rendered unusable.

One common example of conventional methods is the Microsoft® Windows Recycle Bin, which acts as a temporary storage location for soft deleted data, and from which a user may permanently hard delete data, permanently preventing the system architecture from accessing the data and releasing the corresponding physical locations for overwrite.

In some approaches, data stored on a storage medium may be accessed using one or more data set descriptor records, which include information regarding the data to which the record refers, including without limitation, the size of the data, one or more indicators and/or identifiers classifying the data, and/or one or more pointers which indicate the location of the data. Of course, more than one data set descriptor record may be used to store information relating to a data set, depending on the size of the data set. The storage medium may additionally be mapped to determine the location of stored data and/or free space across the entire medium.

As understood in the descriptions that follow, the term "free space" indicates physical space on a physical storage medium that is freely available for writing and/or overwriting data to that physical location. Thus described, free space is to be contrasted with storage space that is occupied by data and therefore unavailable for writing or overwriting without additional instruction by the storage system, e.g., via a storage system manager, a user command, etc., as would be understood by one of skill in the art upon reading the present descriptions.

Furthermore, free space may be contrasted with storage space that is occupied by data, even where the data has been soft and/or hard deleted from the storage system, but the corresponding physical locations have not been released for overwrite. Storage space that is physically occupied by data that has been hard deleted but not released for overwrite is referred to hereinafter as "grey space." As discussed below, even hard deleted data may be recovered from grey space so long as the data residing in the physical storage location has not been overwritten or otherwise rendered unusable.

Therefore, in one approach, it is possible to maximize the duration wherein hard deleted data may be recovered by maximizing the amount of time that deleted data is preserved on a storage volume without being overwritten. Moreover, in some approaches, the amount of time that deleted data is preserved on a storage volume without being overwritten may be maximized by preferentially storing data to free space, as defined above, before storing data to grey space by overwriting the existing data in grey space.

Furthermore, deleted data preservation may be additionally maximized even when free space is completely occupied, and storing any new data would involve overwriting deleted data in grey space. In preferred embodiments of such approaches, data preservation may be further improved by systematically organizing grey space data according to one or more preservation priority criteria. For example, deleted data may be preserved on a first-in-first-out (FIFO) basis. Alternatively, in some approaches, grey space data may be organized according to deletion date, and may be overwritten in order from oldest to youngest. Further still, in other approaches, grey space data may be assigned a preservation priority value, and may be overwritten according to the assigned priority value, preferentially overwriting lower-priority grey space data before higher-priority grey space data. Of course, the above illustrative embodiments are offered by way of example only and are not intended to be limiting in any manner.

In another example illustrating the IBM® z/OS system architecture, data sets (also known as files, data, etc., as would be understood by one having ordinary skill in the art upon reading the present descriptions) may be stored in a plurality of fragments across a physical storage medium or direct access storage device (DASD). Furthermore, the data sets may be accessed with the assistance of a data set descriptor record, also known as a data set control block (DSCB) in the IBM® z/OS system architecture. Further still, DSCBs may be stored in a mapping of the volumes on the physical storage medium or DASD, also known as a volume table of contents (VTOC) in the IBM® z/OS system architecture. Data sets may thus be cross-referenced by pointing to the appropriate DSCB or DSCBs in the VTOC. In the following examples, a data set may be hard deleted or soft deleted.

In some approaches, a system and method for recovering deleted data as described herein may include functionality to restore both soft deleted data and hard deleted data from a physical storage medium or DASD.

In one exemplary embodiment, deleted data may be recovered by utilizing functionality resident within the operating system. For example, when a data set is soft deleted from a storage medium within a system using z/OS, the z/OS provides the functionality from which the deleted data set may be recovered without extensive or time consuming manipulation of the storage medium or DASD on which the data set was stored. Instead, a simple changing of an indicator may restore the data set, in preferred embodiments.

In some embodiments under z/OS, data sets are referenced by one or more types of DSCBs in one or more corresponding DSCB formats represented by format identifiers, for example Format 0"F0," Format 1"F1," Format 3"F3," Format 8"F8," etc., as would be understood by one of skill in the art upon reading the present descriptions.

Furthermore, each DSCB type may serve a distinct function and may include distinct information regarding the associated data set as compared to other DSCB types. In the particular embodiments described herein, F1 DSCBs may contain pointer references to the associated data set, including the data set name, and may therefore be a primary tool for accessing data on the DASD when used in combination with the VTOC.

Therefore, a z/OS user may accomplish a hard delete operation on a data set by modifying the F1 DSCB identifier in the z/OS VTOC. The modification may, in one embodiment, be such that the F1 DSCB is no longer recognized as a F1 DSCB, or any other valid DSCB format. As a result, the data sets associated with the (previously F1) DSCB are accordingly inaccessible unless and until the DSCB is restored to F1.

In other embodiments, F0 DSCBs indicate that the associated physical storage space is free space. Therefore, a z/OS user may designate a physical storage space as free space, thereby releasing the physical storage space, by changing the format of the F1 DSCB associated with the corresponding data set from F1 to F0. Such modifications to DSCB format may release a storage space for overwrite regardless of its current usage or deletion status, for example, a space in active use or a grey space. Of course, many additional format designations may be possible, as would be understood by one of skill in the art upon reading the present descriptions.

Figure 4:
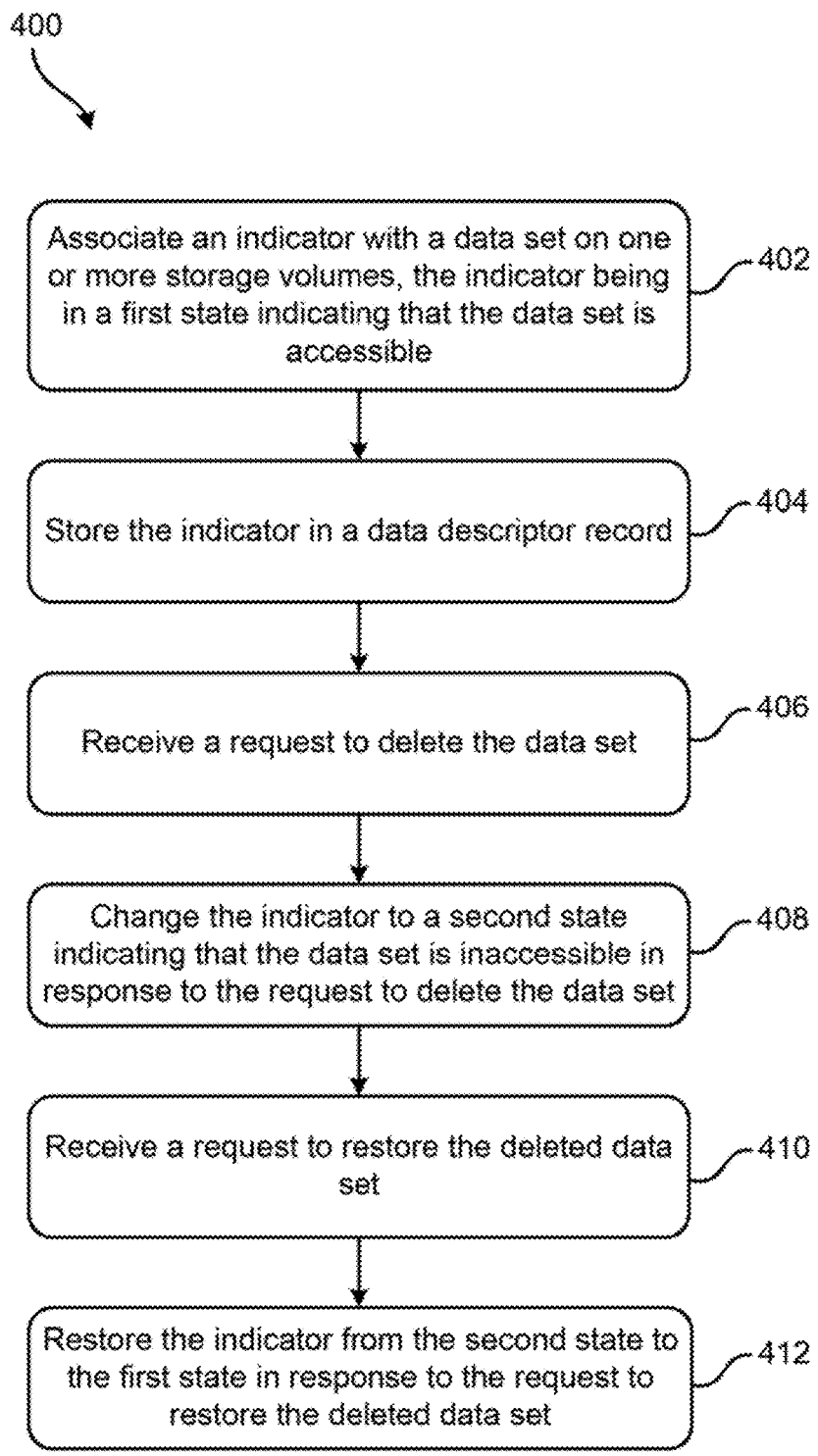
FIG. 4 depicts a flowchart of a method, according to one embodiment.

Referring now to FIG. 4, a method 400 is shown according to one embodiment. The method 400 may be carried out in any desired environment, including those described in FIGS. 1-3, among others. Of course, more or less operations than those described in FIG. 4 may be included in method 400, according to various embodiments.

As shown, the method 400 includes an initial operation 402 for associating an indicator with a data set on one or more storage volumes. This indicator is characterized as being capable of being in multiple states, including, without limitation, a first state indicating that the data set is accessible, a second state indicating that the data set is inaccessible, and possibly a third state indicating that the data set is free space available for overwrite. Of course, other states are also possible which may indicate other aspects of the data set, such as its association with another data set, a type of data set, etc.

That is to say, when the indicator is in the second state, the data set exists unchanged on the one or more storage volumes and is recoverable by restoring the indicator from the second state to the first state, e.g., the data set itself is not modified or changed in response to the request to delete the data set from the one or more storage volumes. Furthermore, in some embodiments, when the indicator is in the second state, access and/or modification to the data set is prevented thereby preserving the data set to be restored. Additionally, in more embodiments, when the indicator is restored from the second state to the first state, the data set is once again accessible and may be modified and/or accessed on the one or more storage volumes.

In operation 404, the indicator is stored in a data set descriptor record (also referred to as a DSCB in z/OS, and the data set descriptor record is stored in at least one mapping of the one or more storage volumes. The mapping may include information relating to the location of data sets and free space on the one or more storage volumes.

According to one embodiment, the method 400 may further include logic adapted for storing a logical and/or physical address of the data set in the data set descriptor record. This address may be included in a pointer which points to the logical and/or physical address of the data set on the one or more storage volumes. Of course, more information beyond that specifically described herein may be included in the data set descriptor record, as would be understood by one of skill in the art upon reading the present descriptions.

In operation 406, a request to delete the data set is received. This request may originate from a user, another system, automatically in response to a condition being met, to free space on the one or more storage volumes, etc.

In operation 408, the indicator is changed to the second state in response to the request to delete the data set. In preferred embodiments, the data set is unchanged as a result of the request to delete the data set. In addition, additional information may be stored to the data set descriptor record in response to the request to delete the data set, such as the time of the request to delete the data set, where the request originated, or any other information that would be reasonably connected to the data set or the request to delete the data set, as would be understood by one of skill in the art upon reading the present descriptions.

In another approach, portions of a data set descriptor record other than the indicator may remain unchanged when the indicator is changed to indicate that the data set is inaccessible. Therefore, it appears that the deletion of the data set does not increase the free space available on the volume(s), since a mapping of the volume does not reflect that more space is available after the data set is deleted. This also acts to prevent the data set from being overwritten since it does not appear as free space to the OS.

Similarly, an amount of free space within the at least one mapping of the one or more storage volumes is not increased by an amount associated with a size of the data set in response to the request to delete the data set. This preserves the data set to be recovered, as it prevents the data set from being overwritten since it does not appear as free space. To recover the data set, the indicator simply is returning to the first state, denoting that the data set is accessible.

In operation 410, a request to restore the deleted data set is received. This request may originate from a user, another system, automatically in response to a condition being met, to restore the data set in order for an application, routine, or process to complete, etc., as would be understood by one of skill in the art upon reading the present descriptions.

In operation 412, the indicator is restored from the second state to the first state in response to the request to restore the data set. As previously described, the first state indicates that the data set is accessible, e.g., it may be modified and/or accessed. Of course, the indicator may be changed to another state which indicates restoration of the data set, if this aspect of the data set is to be tracked and/or effects operation of the one or more storage volumes, according to various embodiments.

According to some embodiments, the method 400 may be limited in that no other portion of the data set descriptor record is changed except for the indicator to indicate that the data set is inaccessible. This allows for the data set to be recovered by simply returning the indicator to the first state, thereby rendering the data set accessible.

Similarly, the method 400 may further include increasing the amount of free space within the at least one mapping of the one or more storage volumes by the amount associated with the data set in response to a request to store the second data set to the one or more storage volumes when an insufficient amount of free space is available on the one or more storage volumes to store the second data set. In this way, the data set may be hard deleted from the one or more storage volumes if the indicator is also changed to a third state indicating that the data set is free space.

Figure 5:
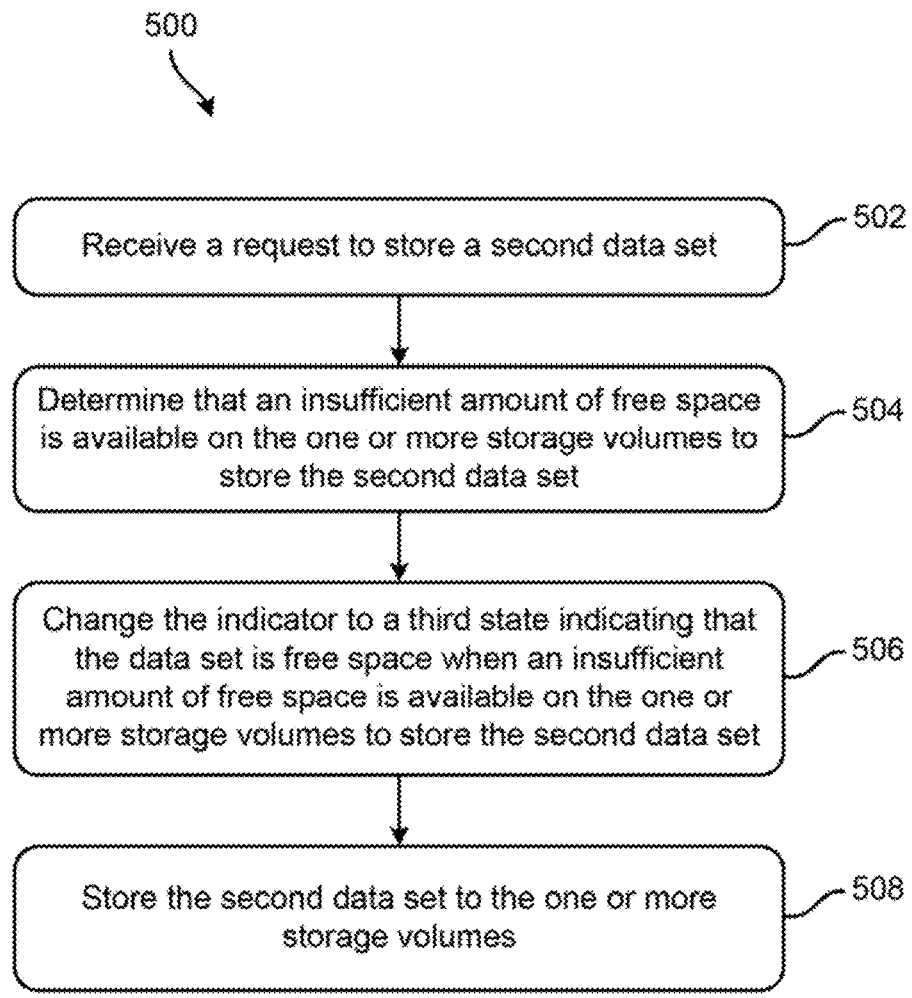
FIG. 5 depicts a flowchart of a method, according to one embodiment.

In other embodiments, a method 500, as shown in FIG. 5 may include additional operations. The method 500 may be carried out in any desired environment, including those shown in FIGS. 1-4, among others. According to the exemplary embodiment of FIG. 5, the method 500 may continue from operation 412 of FIG. 4

Referring again to FIG. 5, in operation 502, a request is received to store a second data set on the storage volume(s). Furthermore, in a subsequent operation 504, it is determined that an insufficient amount of free space on the storage volume(s) is available to store the second data set. Where the amount of free space is determined to be insufficient, operation 506 changes the indicator to a third state, thereby indicating that the storage space occupied by the data set is free space and releasing it for overwrite. Finally, in operation 508, once the storage space is released for overwrite, the system may store the second data set to the desired storage volumes.

According to some embodiments, which may be specific to z/OS, when a data set is deleted, a two character ID field in a data set descriptor record (referred to as a DSCB in z/OS) may be changed to indicate that the data set has been deleted but that the data set still exists on the storage volume(s) where it is stored. In some approaches, no other portion of the data set descriptor record or DSCB (such as the pointer) may be changed except for the indicator to indicate that the data set is inaccessible, thereby allowing the data set to be recovered by simply returning the indicator to the first state, thereby rendering the data set accessible. A mapping of the one or more storage volumes (referred to as a volume table of contents (VTOC) in z/OS) includes a value which indicates an amount of free space that is available within the associated storage volume. This value is not modified to remove an amount of space associated with the data set when the data set is simply soft deleted. This preserves the data set on the storage volume(s), and allows it to be restored if so chosen. If the data set needs to be recovered, the two character ID field in the data set descriptor record or DSCB is changed back to their original values, which makes the data set accessible again, in preferred embodiments.

When a request is received to store a new data set (or second data set, for simplicity) on the storage volume, or an existing data set is extended, the two character ID field in the data set descriptor record or DSCB of one or more data sets which were soft deleted may be changed to another value indicating that the data set is free space on the storage volume, and may be overwritten to accommodate the second data set. The data set that was soft deleted is no longer accessible after this point.

An extension to this method includes preserving the deleted data sets for as long as possible. That is, as requests to store new data sets on the storage volume(s) are received, the new data sets will be stored such that they do not overwrite any soft deleted data sets on the storage volume(s). Eventually, as more and more data sets are stored to the storage volume(s), the amount of free space will decrease until it is insufficient to store the next data set to be stored. At this point, data sets occupied by one or more soft deleted data sets may need to be overwritten, effectively destroying the data within the soft deleted data set and any associated data sets. At that point, in a preferred embodiment, a first-in-first-out (FIFO) scheme may be employed such that the oldest soft deleted data sets will be the first to be overwritten. Of course, any other scheme may be employed with which to choose which data sets to overwrite as would be understood by one of skill in the art upon reading the present descriptions.

In another embodiment, a system may comprise a data storage device for storing one or more storage volumes and logic adapted for executing any of the methods described above. For example, in one embodiment, the system may include logic adapted for associating an indicator with a data set on the one or more storage volumes, wherein the indicator is in a first state indicating that the data set is accessible, logic adapted for storing the indicator associated with the data set in a data set descriptor record, wherein the record is stored in at least one mapping of the one or more storage volumes, logic adapted for receiving a request to delete the data set, logic adapted for changing the indicator to a second state indicating that the data set is inaccessible in response to the request to delete the data set, with the proviso that the data set is unchanged, logic adapted for receiving a request to restore the deleted data set, and logic adapted for restoring the indicator from the second state to the first state in response to the request to restore the deleted data set. Of course, any of the other embodiments and/or approaches described above may be incorporated into the system, as would be understood by one of skill in the art upon reading the present descriptions.

According to another embodiment, a computer program product for restoring deleted data may include computer readable program code configured to perform any or all operations in any of the methods described herein. For example, the computer program product may comprise a computer readable storage medium having computer readable program code embodied therewith, the computer readable program code being configured to: associate an indicator with a data set on one or more storage volumes, wherein the indicator is in a first state indicating that the data set is accessible, store the indicator associated with the data set in a data set descriptor record, wherein the record is stored in at least one mapping of the one or more storage volumes, receive a request to delete the data set, change the indicator to a second state indicating that the data set is inaccessible in response to the request to delete the data set, with the proviso that the data set is unchanged, receive a request to restore the deleted data set, and restore the indicator from the second state to the first state in response to the request to restore the deleted data set.

Of course, any other embodiments and/or approaches described herein may be incorporated into the computer program product, as would be apparent to one of skill in the art upon reading the present descriptions.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system comprising:
   a data storage device for storing one or more storage volumes; and
   a processor and instructions stored in a memory, the instructions executed by the processor to perform operations comprising:
      associating an indicator with a data set on the one or more storage volumes, wherein the indicator is in a first state indicating that the data set is accessible;
      storing the indicator associated with the data set in a data set descriptor record, wherein the data set descriptor record is stored in at least one mapping of the one or more storage volumes;
      receiving a request to delete the data set;
      changing the indicator to a second state indicating that the data set is inaccessible in response to the request to delete the data set, with the proviso that the data set is unchanged;
      preferentially preserving data sets whose indicator has been changed to the second state according to one or more preservation priority criteria, the preservation priority criteria comprising at least: a priority value assigned thereto, wherein data sets whose indicator has more recently been changed to the second state are preserved over data sets whose indicator has been changed to the second state less recently in a first-in-first-out (FIFO) basis in response to a request to store a second data set to the one or more storage volumes on determining an insufficient amount of free space is available on the one or more storage volumes to store the second data set;
      receiving a request to restore the deleted data set; and
      restoring the indicator from the second state to the first state in response to the request to restore the deleted data set.

2. The system as recited in claim 1, wherein the operation further comprises storing a logical and/or physical address of the data set in the data set descriptor record.

3. The system as recited in claim 1, wherein the operation further comprises:
   on determining the indicator is in the second state, preserving the data set unchanged on the storage volume such that the data set is not overwritten and is recoverable by restoring the indicator from the second state to the first state;
   on determining the indicator is in the second state, preventing access and/or modification to the data set; and
   in response to the indicator being restored from the second state to the first state, providing access to the data set.

4. The system as recited in claim 1, wherein an amount of free space within the at least one mapping of the one or more storage volumes is not increased by an amount associated with a size of the data set in response to the request to delete the data set.

5. The system as recited in claim 4, wherein the operation further comprises increasing the amount of free space within the at least one mapping of the one or more storage volumes by the amount associated with the data set in response to a request to store a second data set to the one or more storage volumes on determining an insufficient amount of free space is available on the one or more storage volumes to store the second data set.

6. A system, comprising:
   a data storage device for storing one or more storage volumes; and
   a processor and instructions stored in a memory, the instructions executed by the processor to perform operations comprising:
      associating an indicator with a data set on the one or more storage volumes, wherein the indicator is in a first state indicating that the data set is accessible;
      storing the indicator associated with the data set in a data set descriptor record, wherein the data set descriptor record is stored in at least one mapping of the one or more storage volumes;
      receiving a request to delete the data set;
      changing the indicator to a second state indicating that the data set is inaccessible in response to the request to delete the data set, with the proviso that the data set is unchanged;

preferentially preserving data sets whose indicator has been changed to the second state according to one or more preservation priority criteria, the preservation priority criteria comprising at least: a priority value assigned thereto;

receiving a request to restore the deleted data set; and restoring the indicator from the second state to the first state in response to the request to restore the deleted data set, wherein the logic adapted to preferentially preserve data sets whose indicator has been changed to the second state is configured to:

assign a priority value to each data set whose indicator has been changed to the second state, wherein a data set whose indicator has been changed to the second state with a lower priority value is overwritten before a data set whose indicator has been changed to the second state with a higher priority value; and preserve data sets whose indicator has been changed to the second state according to the assigned priority values in response to a request to store a second data set to the one or more storage volumes on determining an insufficient amount of free space is available on the one or more storage volumes to store the second data set.

7. A system, comprising:

a data storage device for storing one or more storage volumes; and a processor and instructions stored in a memory, the instructions executed by the processor to perform operations comprising:

associating an indicator with a data set on the one or more storage volumes, wherein the indicator is in a first state indicating that the data set is accessible;

storing the indicator associated with the data set in a data set descriptor record, wherein the data set descriptor record is stored in at least one mapping of the one or more storage volumes;

receiving a request to delete the data set;

changing the indicator to a second state indicating that the data set is inaccessible in response to the request to delete the data set, with the proviso that the data set is unchanged;

preferentially preserving data sets whose indicator has been changed to the second state according to one or more preservation priority criteria, the preservation priority criteria comprising at least: a priority value assigned thereto;

receiving a request to restore the deleted data set; and restoring the indicator from the second state to the first state in response to the request to restore the deleted data set, wherein no other portion of the data set descriptor record is changed except for the indicator to indicate that the data set is inaccessible, and wherein the preservation priority criteria further comprises: a date that the request to delete the data set was received, wherein a data set whose indicator has been changed to the second state with an older requested delete date is overwritten before a data set whose indicator has been changed to the second state with a newer requested delete date.

8. A computer program product for restoring deleted data, the computer program product comprising a non-transitory computer readable storage medium having computer readable program code embodied therewith, the computer readable program code executed by a processor to perform operations comprising:

associating an indicator with a data set on one or more storage volumes, wherein the indicator is in a first state indicating that the data set is accessible;

storing the indicator associated with the data set in a data set descriptor record, wherein the data set descriptor record is stored in at least one mapping of the one or more storage volumes;

receiving a request to delete the data set;

changing the indicator to a second state indicating that the data set is inaccessible in response to the request to delete the data set, with the proviso that the data set is unchanged;

preferentially preserving data sets whose indicator has been changed to the second state according to one or more preservation priority criteria, the preservation priority criteria comprising at least a priority value assigned thereto, changing the indicator to a second state by assigning a priority value to each data set whose indicator has been changed to the second state, wherein a data set whose indicator has been changed to the second state with a lower priority value is overwritten before a data set whose indicator has been changed to the second state with a higher priority value, and by preserving data sets whose indicator has been changed to the second state according to the assigned priority values in response to a request to store a second data set to the one or more storage volumes on determining an insufficient amount of free space is available on the one or more storage volumes to store the second data set;

receiving a request to restore the deleted data set; and restoring the indicator from the second state to the first state in response to the request to restore the deleted data set.

9. The computer program product as recited in claim 8, wherein the operations further comprise storing a logical and/or physical address of the data set in the data set descriptor record.

10. The computer program product as recited in claim 8, wherein the operations further comprise:

on determining the indicator is in the second state, preserve the data set unchanged on the storage volume such that the data set is recoverable by restoring the indicator from the second state to the first state;

on determining the indicator is in the second state, prevent access and/or modification to the data set; and in response to the indicator being restored from the second state to the first state, provide access to the data set.

11. The computer program product as recited in claim 8, wherein the operations further comprise preferentially preserving data sets whose indicator has been changed to the second state comprises preserving data sets whose indicator has more recently been changed to the second state over data sets whose indicator has been changed to the second state less recently in a first-in-first-out (FIFO) basis in response to a request to store a second data set to the one or more storage volumes on determining an insufficient amount of free space is available on the one or more storage volumes to store the second data set.

12. The computer program product as recited in claim 8, wherein the preferentially preserving data sets whose indicator has been changed to the second state comprises:

assigning a priority value to each data set whose indicator has been changed to the second state, wherein a data set whose indicator has been changed to the second state with a lower priority value is overwritten before a data set whose indicator has been changed to the second state with a higher priority value; and preserving data sets whose indicator has been changed to the second state according to the assigned priority values in response to a request to store a second data set to the one or more storage volumes on determining an insufficient amount of free space is available on the one or more storage volumes to store the second data set.

13. The computer program product as recited in claim 8, wherein no other portion of the data set descriptor record is changed except for the indicator to indicate that the data set is inaccessible, and wherein the preservation priority criteria further comprises: a date that the request to delete the data set was received, wherein a data set whose indicator has been changed to the second state with an older requested delete date is overwritten before a data set whose indicator has been changed to the second state with a newer requested delete date.

14. The computer program product as recited in claim 8, wherein an amount of free space within the at least one mapping of the one or more storage volumes is not increased by an amount associated with a size of the data set in response to the request to delete the data set, and wherein the operations include restoring both soft deleted data and hard deleted data from a physical storage medium and/or a direct access storage device (DASD).

15. The computer program product as recited in claim 14, wherein the operations further comprise increasing the amount of free space within the at least one mapping of the one or more storage volumes by the amount associated with the data set in response to a request to store a second data set to the one or more storage volumes on determining an insufficient amount of free space is available on the one or more storage volumes to store the second data set.

16. A method for recovering deleted data, the method comprising:

associating an indicator with a data set on one or more storage volumes, wherein the indicator is in a first state indicating that the data set is accessible;

storing, using a hardware processor, the indicator associated with the data set in a data set descriptor record, wherein the data set descriptor record is stored in at least one mapping of the one or more storage volumes;

receiving, using the hardware processor, a request to delete the data set;

changing, using the hardware processor, the indicator to a second state indicating that the data set is inaccessible in response to the request to delete the data set, with the proviso that the data set is unchanged;

preferentially preserving data sets whose indicator has been changed to the second state, using the hardware processor, according to one or more preservation priority criteria, the preservation priority criteria comprising at least a priority value assigned thereto and a date that the request to delete the data set was received, wherein a data set whose indicator has been changed to the second state with an older requested delete date is overwritten before a data set whose indicator has been changed to the second state with a newer requested delete date, and wherein a data set whose indicator has been changed to the second state with a lower priority value is overwritten before a data set whose indicator has been changed to the second state with a higher priority value, wherein data sets whose indicator has more recently been changed to the second state is are preferentially preserved over data sets whose indicator has been changed to the second state less recently in a first-in-first-out (FIFO) basis in response to a request to store a second data set to the one or more storage volumes on determining an insufficient amount of free space is available on the one or more storage volumes to store the second data set;

receiving, using the hardware processor, a request to restore the deleted data set; and restoring, using the hardware processor, the indicator from the second state to the first state in response to the request to restore the deleted data set.

17. The method as recited in claim 16, further comprising:

receiving a request to store a second data set;

determining that an insufficient amount of free space is available on the one or more storage volumes to store the second data set;

changing the indicator to a third state indicating that the data set is free space on determining an insufficient amount of free space is available on the one or more storage volumes to store the second data set; and storing the second data set to the one or more storage volumes.

18. The method as recited in claim 17, wherein on determining the indicator is in the second state, access and/or modification to the data set is prevented, and wherein on determining the indicator is restored from the second state to the first state, the data set is accessible.

19. The method as recited in claim 16, wherein no other portion of the data set descriptor record is changed except for the indicator to indicate that the data set is inaccessible.

* * * * *